(12) United States Patent
Chen et al.

(10) Patent No.: US 12,106,651 B2
(45) Date of Patent: Oct. 1, 2024

(54) COLLISION AVOIDANCE OF HEAD MOUNTED DISPLAYS

(71) Applicant: Hewlett-Packard Development Company, L.P., Spring, TX (US)

(72) Inventors: Chung-Chun Chen, Taipei (TW); Ming-Shien Tsai, Taipei (TW); Chih-Ming Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 5 days.

(21) Appl. No.: 18/004,361

(22) PCT Filed: Aug. 4, 2020

(86) PCT No.: PCT/US2020/044826
§ 371 (c)(1),
(2) Date: Jan. 5, 2023

(87) PCT Pub. No.: WO2022/031266
PCT Pub. Date: Feb. 10, 2022

(65) Prior Publication Data
US 2023/0282089 A1    Sep. 7, 2023

(51) Int. Cl.
*G08B 21/02* (2006.01)
*G06F 3/01* (2006.01)

(52) U.S. Cl.
CPC .............. *G08B 21/02* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 9,599,818 B2 | 3/2017 | Yamagishi et al. | |
| 9,754,167 B1 | 9/2017 | Holz et al. | |
| 9,779,555 B2 | 10/2017 | Chang et al. | |
| 10,204,455 B2 | 2/2019 | Yao et al. | |
| 2006/0273984 A1* | 12/2006 | Wanda | A63F 13/213 345/7 |
| 2011/0090252 A1 | 4/2011 | Yoon et al. | |
| 2013/0215149 A1 | 8/2013 | Hayashi | |
| 2018/0093184 A1* | 4/2018 | Stafford | A63F 13/49 |
| 2019/0212812 A1 | 7/2019 | Sawyer et al. | |
| 2020/0103521 A1* | 4/2020 | Chiarella | H04W 4/80 |

FOREIGN PATENT DOCUMENTS

WO    2017/120917 A1    7/2017

* cited by examiner

*Primary Examiner* — Thomas S McCormack
(74) *Attorney, Agent, or Firm* — Knobbe, Martens, Olson & Bear, LLP

(57) ABSTRACT

In example implementations, a head mounted display (HMD) is provided. The HMD includes a first wireless radio, a second wireless radio, and a controller. The first wireless radio is to establish a connection to a host computer. The second wireless radio is to connect to a second HMD via a channel. The controller is communicatively coupled to the first wireless radio and the second wireless radio. The controller is to receive a notification of a presence of the second HMD from the host computer via the connection, track movement of the second HMD via the channel, and generate a collision avoidance alert when the second HMD is within a distance threshold of the HMD.

12 Claims, 6 Drawing Sheets

COLLISION AVOIDANCE OF HEAD MOUNTED DISPLAYS

BACKGROUND

Virtual reality (VR) systems provide a simulated environment for users. The VR systems may include applications that allow users to feel as if they are in a simulated environment. The VR system may provide visual and haptic feedback to immerse the user in the simulated environment.

The VR system may include a head mounted display (HMD). The HMD may be worn by a user to see the simulated environment. VR applications may include video games, learning simulations, training simulations, and the like.

DETAILED DESCRIPTION

Examples described herein provide an apparatus that includes multiple wireless radios to detect and avoid collisions. As discussed above, VR systems may include HMDs. An example of an application executed on a VR system may include a multi-player application (e.g., a multi-player video game, a multi-player training application, and the like).

In the example of multi-player video games, each user may wear an HMD. The video game may involve movement of the users through different environments or levels in the game. However, the users may be located within a relative small or enclosed environment. Thus, as the users move around the environment, there is a high likelihood of collision. Collisions may lead to injuries, damage to the HMDs, damage to items in the environment, and the like.

The present disclosure provides an HMD that may include multiple wireless radios. A first wireless radio may be used to establish a first connection to a host computer. The host computer may transmit application data for the VR application to the HMD via the first connection. The host computer may also communicate how many other HMDs are in the room with the HMD.

A second wireless radio may be used to establish a second connection with other HMDS in the room. The HMD may open a number of channels over the second wireless radio that is equal to the number of HMDs in the room reported by the host computer. The HMD may then track the movement of other HMDs in the room based on data collected over the different channels via the second wireless radio.

In an example, when the other HMDs move too close to the HMD, or vice versa, the HMD may generate a collision avoidance warning. The collision avoidance warning may be a visual alert shown in the display of the HMD. The collision avoidance warning may indicate a direction in which the collision is to occur and other information (e.g., which direction to move safely to avoid the collision).

Figure 1:
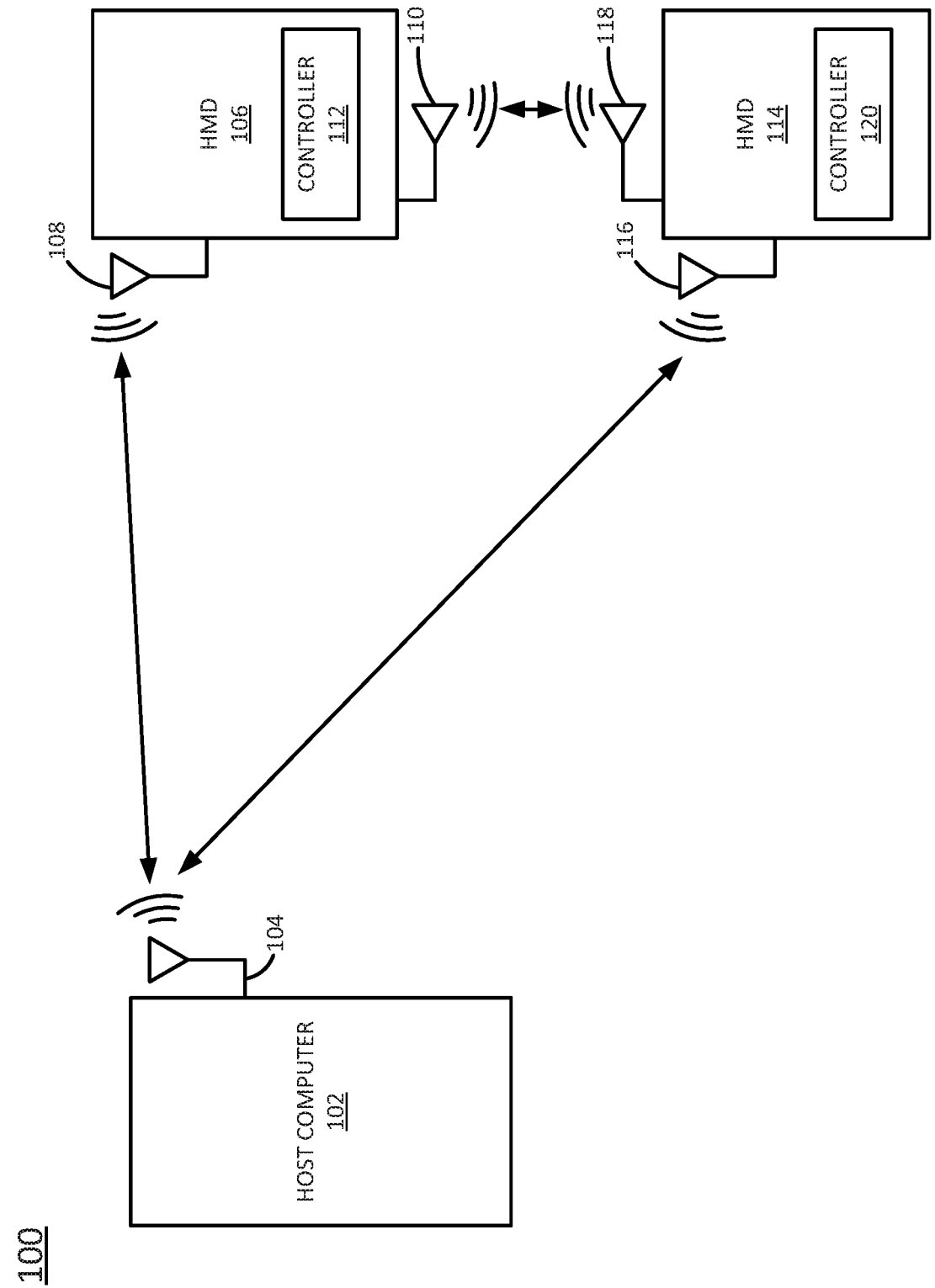
FIG. 1 is a block diagram of an example system of the present disclosure that includes a host computer and head mounted displays (HMDs) that can track movement of other HMDs to avoid collision.

FIG. 1 illustrates an example of a system 100 that includes HMDs that can perform collision avoidance with dual wireless radios. In an example, the system 100 may include a host computer 102, a head mounted display (HMD) 106, and an HMD 114. Although two HMDs 106 and 114 are illustrated in FIG. 1, it should be noted that any number of HMDs may be deployed.

In addition, it should be noted that FIG. 1 has been simplified for ease of explanation. FIG. 1 may include additional hardware and components that are not shown. For example, the system 100 may also include a Wi-Fi router, a gateway, and the like.

In an example, the host computer 102 may be a desktop computer, a laptop computer, a server, and the like. The host computer 102 may include a processor and a memory that stores instructions that are executed by the processor. In an example, the instructions may be associated with an application, such as a virtual reality (VR) application. The VR application may be a multi-player game, a tutorial, an experience, and the like. In other words, the VR application may host multiple players within a common VR environment where the players may interact with one another within the VR environment.

In an example, the host computer 102 may include a wireless radio 104. The wireless radio 104 may transmit and receive wireless communication signals to and from the HMD 106 and 114. The wireless communication signals may be transmitted via a Wi-Fi network within a room or a location where the host computer 102, the HMD 106, and the HMD 114 are located.

In an example, the HMD 106 may include a first wireless radio 108, a second wireless radio 110, and a controller 112. The first wireless radio 108 and the second wireless radio 110 may be communicatively coupled to the controller 112. The first wireless radio 108 and the second wireless radio 110 may communicate wirelessly using a Wi-Fi network or communication protocol.

In an example, the first wireless radio 108 may establish a connection to the host computer 102. The HMD 106 may receive VR application data from the host computer 102 via the connection between the first wireless radio 108 and the wireless radio 104.

The HMD 106 may also receive information related to a number of other HMDs within a room or the VR application from the host computer 102 via the first wireless radio 108. The number of HMDs in the room can be used by the HMD 106 to determine a number of channels to open via the second wireless radio 110. As discussed in further details below, the HMD 106 can track movements of the other HMDs in the room based on data collected over the channels with the second wireless radio 110. Collision avoidance alerts can be generated and displayed on the HMD 106 when the movement of other HMDs indicates that a collision is imminent or that one of the other HMDs is moving too close to the HMD 106.

The second wireless radio 110 may connect to a second HMD (e.g., HMD 114) via a channel. As noted above, any number of HMDs may be deployed. For example, if there are five additional HMDs near the HMD 106, the host computer 102 may transmit the number of HMDs to the HMD 106. The HMD 106 may then open five channels via the second wireless radio 110 to connect to respective wireless radios of the other five HMDs. In other words, each channel may collect data to track movement of one of the five HMDs.

In the example illustrated in FIG. 1, the second wireless radio 110 may open a channel to establish a wireless connection to a second wireless radio 118 of the HMD 114. The HMD 114 may be similar to the HMD 106. For example, the HMD 114 may also include a first wireless radio 116, the second wireless radio 118, and a controller 120. The HMD 114 may receive VR application data from the host computer 102 via the first wireless radio 116 and may track movement of other HMDs via the second wireless radio 118.

Referring back to the HMD 106, the controller 112 may receive a notification of a presence of the HMD 114 from the host computer 102 via the first connection between the first wireless radio 108 and the wireless radio 104. The controller 112 may then track movement of the HMD 114 via the channel opened with the second wireless radio 110.

In an example, movement of the HMD 114 may be tracked using data collected over the channel that is opened between the second wireless radio 110 of the HMD 106 and the second wireless radio 118 of the HMD 114. The data may be wireless signal strength data, e.g., relative signal strength indicator (RSSI) data. The changes in the wireless signal strength data may be used to determine or track movement and distance of the adjacent HMDs relative to the HMD 106.

In an example, the controller 112 may measure RSSI data to determine distance and direction of movement of the HMD 114. The distance may be determined based on the signal strength. For example, the stronger the signal, the closer the HMD 114 may be to the HMD 106. The weaker the signal, the further away the HMD 114 may be from the HMD 106.

The direction of movement may be determined based on an angle of reception of the signal over the second wireless radio 110 or a triangulation of the wireless signals. For example, the angle from which a signal is received on the second wireless radio 110 may be calculated to determine a direction in which the HMD 114 is moving. In an example, the second wireless radio 110 and the second wireless radio 118 may use an antenna array. The position of the HMD 114 may be determined based on a triangulation of the signals from the antenna array.

In an example, the movement of the HMD 114 near or adjacent to the HMD 106 may be tracked as a vector (e.g., direction and distance). In an example, the movement of the HMD 114 may be tracked as a speed or a velocity. For example, consecutive RSSI data measurements may be taken within a time period to calculate velocity. The controller 112 may predict a potential collision based on the velocity of the HMD 114 and a current distance to generate a collision avoidance alert.

In an example, the controller 112 may calculate the movement and velocity of the HMD 106. The movement of the HMD 106 may be calculated based on an accelerometer (not shown) in the HMD 106. The combination of the movement of the HMD 106 and the movement of the HMD 114 may be used to detect a potential collision and generate a collision avoidance alert.

Figure 3:
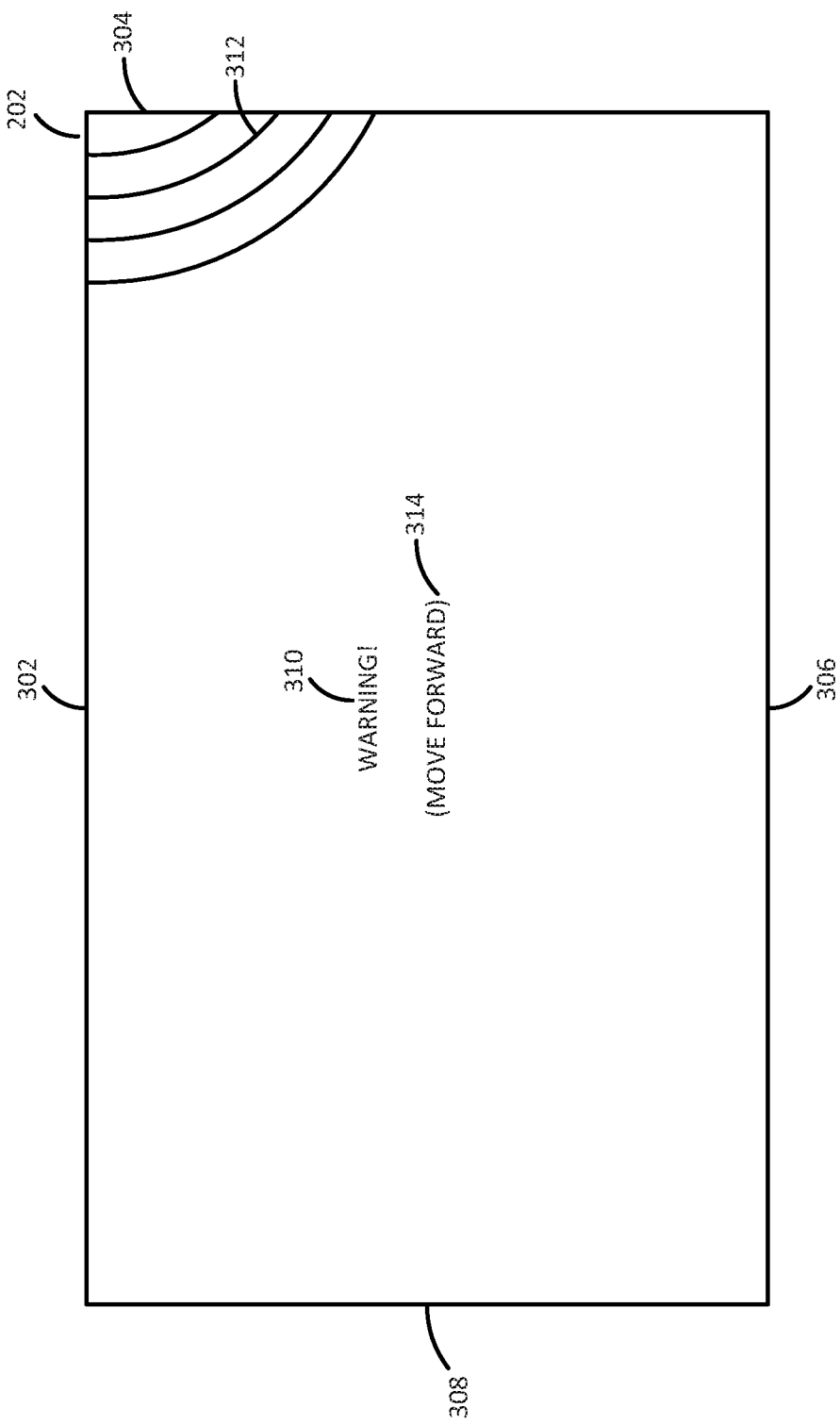
FIG. 3 is a block diagram of an example graphical display of the HMD that indicates a collision alert.

The controller 112 may track the movement of the HMD 114. When the distance of the HMD 114 is below a distance threshold, the controller 112 may generate a collision avoidance alert. The collision avoidance alert may be displayed on a display of the HMD 106 to alert a user. The collision avoidance alert may provide a direction from which the collision is likely to occur, provide a direction in which to move to avoid a collision, and other pertinent information. Examples of the collision avoidance alert are illustrated in FIG. 3, and discussed in further details below.

Figure 2:
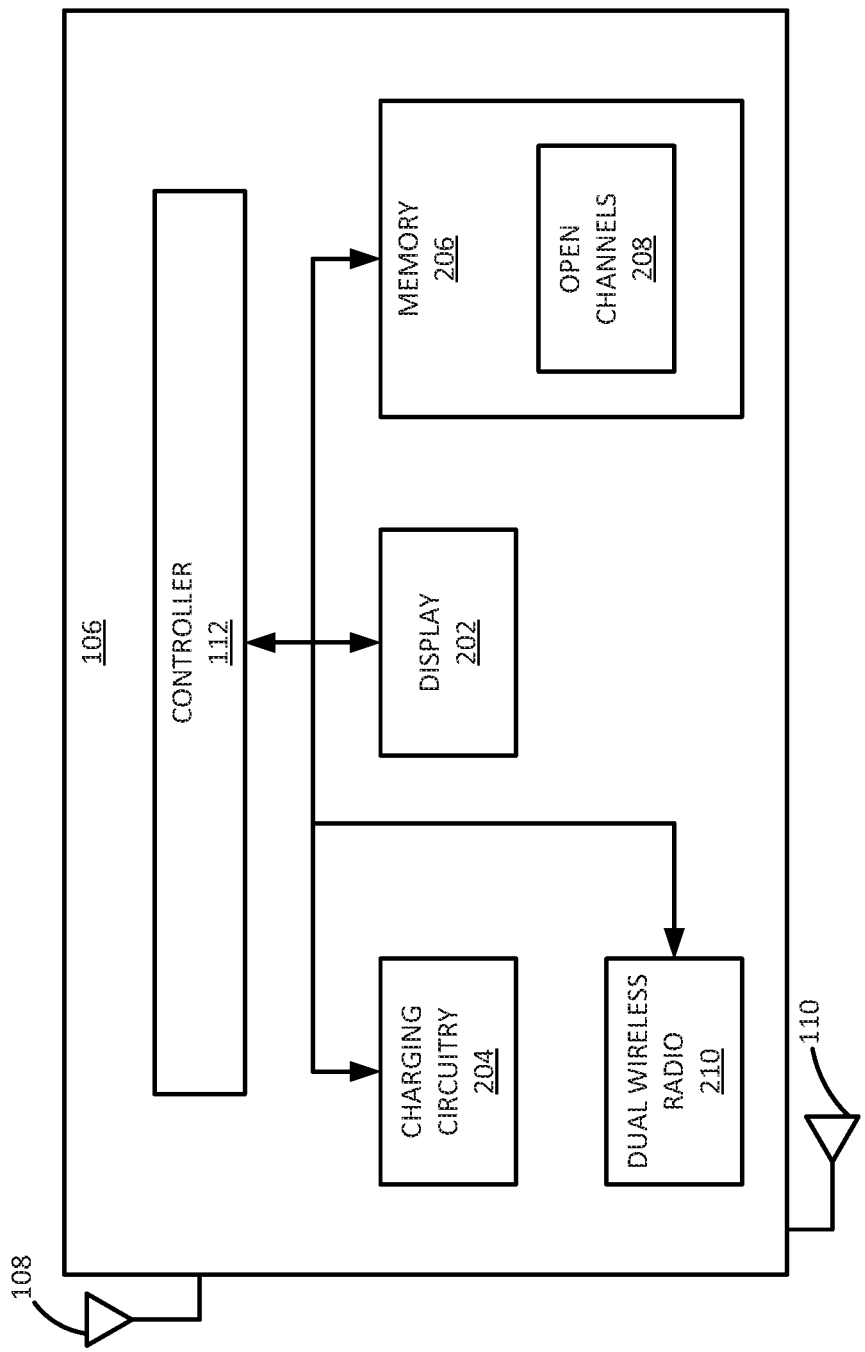
FIG. 2 is a block diagram of an example HMD of the present disclosure that includes two wireless radios to avoid collisions.

FIG. 2 illustrates a more detailed block diagram of the HMD 106 with dual wireless radios to perform collision avoidance. It should be noted that the HMD 114 may include similar components.

In an example, the HMD 106 may include the controller 112, the first wireless radio 108 and the second wireless radio 110, as illustrated in FIG. 1. The HMD 106 may also include a display 202, charging circuitry 204, a memory 206, and dual wireless radios 210. The controller 112 may be communicatively coupled to the display 202, the charging circuitry 204, the memory 206, and the dual wireless radio 210. The controller 112 may control operation of the display 202, the charging circuitry 204, and the dual wireless radio 210. The controller 112 may also execute instructions stored in the memory 206 or read data from or write data to the memory 206.

In an example, the display 202 may be a monitor or panel attached to the HMD 106 that displays graphical information. The graphical information may be generated by a graphical processing unit (GPU) (not shown) or by the host computer 102 and transmitted to the HMD 106. The display 202 may display the collision avoidance alert that is generated by the controller 112, as noted above and discussed in further details below.

In example, the charging circuitry 204 may include circuitry to charge a battery or power source of the HMD 106. For example, the HMD 106 may be wireless and be battery powered.

In an example, the dual wireless radio 210 may be an interface to communicatively couple the first wireless radio 108 and the second wireless radio 110 to the controller 112. The dual wireless radio 210 may include Wi-Fi data and protocols to allow the first wireless radio 108 and the second wireless radio 110 to operate independently and to establish different wireless connections.

In an example, the memory 206 may be a non-transitory computer readable medium. For example, the memory 206 may be a random access memory (RAM), a read-only memory (ROM), a hard-disk drive, a solid state drive, and the like.

The memory 206 may include open channels 208. The open channels 208 may keep track of which channel is assigned to which adjacent HMD (e.g., the HMD 114). Said another way, the assignments of channels to adjacent HMDs may be stored in the open channels 208. For example, the host computer 102 may indicate that there are two adjacent HMDs in the room with the HMD 106. The controller 112 may open two channels via the second wireless radio 110. The open channels 208 may store the two open channels and the assignment of the channels to respective HMDs. For example, open channel 1 may be assigned to a first adjacent HMD and open channel 2 may be assigned to a second adjacent HMD. The open channels 208 may help the controller 112 keep track of which RSSI data belongs to which adjacent HMD to allow the controller 112 to track and monitor movement of the adjacent HMDs.

As noted above, RSSI data can be used to track movement of the adjacent HMDs. When the RSSI data on an open channel correlates to a distance that falls below a distance threshold (e.g., signal strength is high indicating that an adjacent HMD is too close), the open channels 208 may indicate the adjacent HMD that is too close. In response, the controller 112 may generate a collision avoidance alert.

FIG. 3 illustrates an example of a collision avoidance alert 300. In an example, the display 202 may include a top side 302, a right side 304, a bottom side 306, and a left side 308. The top side 302 may indicate a direction in front of the user, the right side 304 may indicate a direction to the right of the user, the bottom side 306 may indicate a direction behind the user, and the left side 308 may indicate a direction to the left of the user.

In an example, the collision avoidance alert 300 may be generated and displayed when an adjacent HMD moves within a distance threshold of the HMD of the user, as described above. In an example, the collision avoidance alert 300 may include a text message 310. For example, the text message 310 may alert the user that a collision is imminent.

In an example, the collision avoidance alert 300 may also include an indication 312. The indication 312 may include a visual indication, such as a graphic, a flashing light, or a combination thereof. In an example, the indication 312 may also provide a directional indication, or an indication of a location from which a collision is to occur, based on where the indication 312 is displayed on the display 202. For example, if the indication 312 is located in the upper right corner of the display 202, the indication 312 may convey that the collision may occur from the front right of the user. In another example, if the indication 312 is located on the bottom side 306 of the display 202, then the indication 312 may convey that the collision may occur from behind the user, and so forth.

In an example, the indication 312 may move dynamically on the display 202 as the HMD or user wearing the HMD moves. For example, if the user suddenly turns around, the indication 312 may also be moved on the display 202. For example, the user may be facing in a first direction and the indication 312 may be shown on the upper right hand corner of the display 202. The user may turn around 180 degrees. In response, the indication 312 may be animated on the display 202 to move around the display to the bottom left hand corner of the display 202 in the same direction that the user rotates.

In an example, the collision avoidance alert 300 may also include avoidance instructions 314. The avoidance instructions 314 may suggest a direction for the user to move toward to avoid the collision. The avoidance instructions 314 may take into consideration other HMDs that may be located around the user.

For example, the user may instinctively move to the left when the indication 312 indicates a collision is coming from the right side of the user. However, another HMD may be located to the left side of the user. As a result, moving to the left side may also generate a collision avoidance alert. Thus, the avoidance instructions 314 may instruct the user to move forward to avoid the collision.

As noted above, the HMD 106 may include open channels 208 that can collect wireless signal strength data over different channels for each HMD. The open channels 208 may keep track of the movement of each HMD via the respective channels and associated wireless signal strength data. The controller 112 may calculate the location and distance of each adjacent HMD around the HMD 106 to determine the direction in which the HMD 106 should move to avoid a collision. The avoidance instructions 314 may be generated based on this determination from analysis of the location and movement of the HMDs tracked in the open channels 208 stored in the memory 206.

Figure 4:
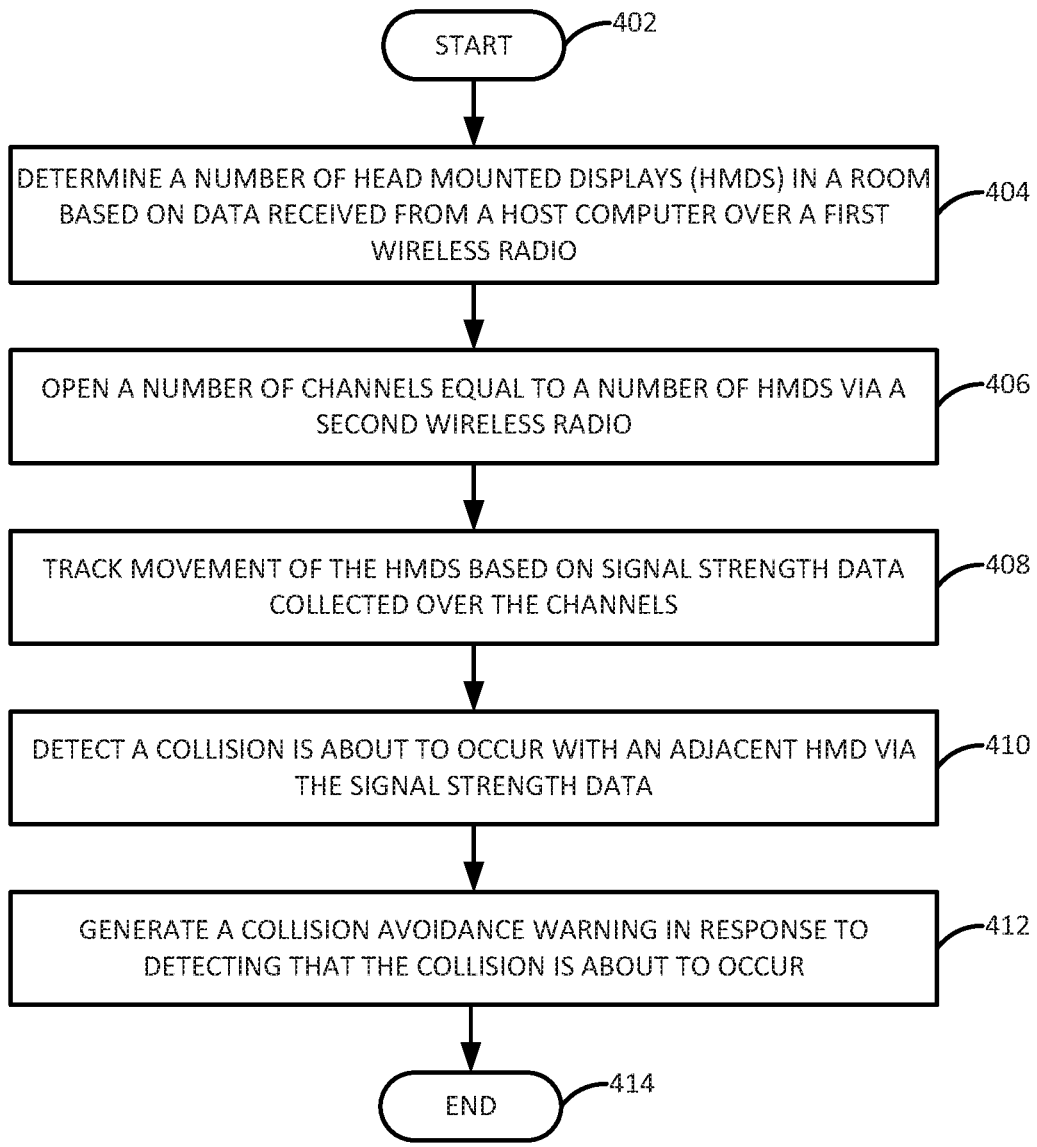
FIG. 4 is a flow chart of an example method for tracking movement of HMDs to avoid collisions via two wireless radios of the HMD of the present disclosure.

FIG. 4 illustrates a flow diagram of an example method 400 for tracking movement of HMDs to avoid collisions via two wireless radios of the HMD of the present disclosure. In an example, the method 400 may be performed by the HMD 106, the HMD 114, the apparatus 500 illustrated in FIG. 5, and described below, or the apparatus 600 illustrated in FIG. 6, and described below.

At block 402, the method 400 begins. At block 404, the method 400 determines a number of HMDs in a room based on data received from a host computer over a first wireless radio. For example, the first wireless radio may establish a wireless connection to a wireless radio of the host computer. The host computer may provide information related to the number of HMDs that is located within the room where the HMD is located. The host computer may also transmit VR application data to the HMD via the connection between the first wireless radio and the wireless radio of the host computer. The VR application may be a multiplayer video game, an interactive tutorial, and the like.

At block 406, the method 400 opens a number of channels equal to a number of HMDs via a second wireless radio. In an example, the HMD may assign each open channel to one of the adjacent HMDs in the room. For example, if there are five adjacent HMDs, then the HMD may open five channels via the second wireless radio. Each channel may be assigned to one of the five adjacent HMDs. The channel assignments may be stored in memory to track the movement of each adjacent HMD within the room.

At block 408, the method 400 tracks movement of the HMDs based on signal strength data collected over the channels. For example, the signal strength data may be wireless signal strength (e.g., RSSI data). The signal strength may be correlated to a distance. For example, the distance between two wireless radios may be measured and associated with a signal strength. Multiple data points may be collected to generate a function of signal strength to distance. The subsequently measured signal strengths may then be used to calculate a distance based on the function.

In an example, the direction of movement may also be calculated based on the angle of arrival of the wireless signal or a triangulation of the wireless signal with an antenna array. In an example, velocity may also be measured to predict that a collision is imminent.

At block 410, the method 400 detects a collision is about to occur with an adjacent HMD via the signal strength data. For example, when the distance of an adjacent HMD falls below a distance threshold, the method 400 may detect that a collision is about to occur. The location from which the collision is to occur may also be detected based on tracking the direction of movement in block 408.

At block 412, the method 400 generates a collision avoidance warning in response to detecting that the collision is about to occur. In an example, the collision avoidance warning may include a text message, a visual indication, and/or collision avoidance instructions. For example, the text message may alert the user that a collision is about to occur. The visual indication may be a graphical image or flashing light that indicates a direction from which the collision is about to occur. The collision avoidance instructions may provide instructions with respect to a direction in which the user may safely move to avoid the collision. The collision avoidance instructions may take into consideration the location of other HMDs located adjacent to the HMD to select the safest direction for the user to move. At block 414, the method 400 ends.

Figure 5:
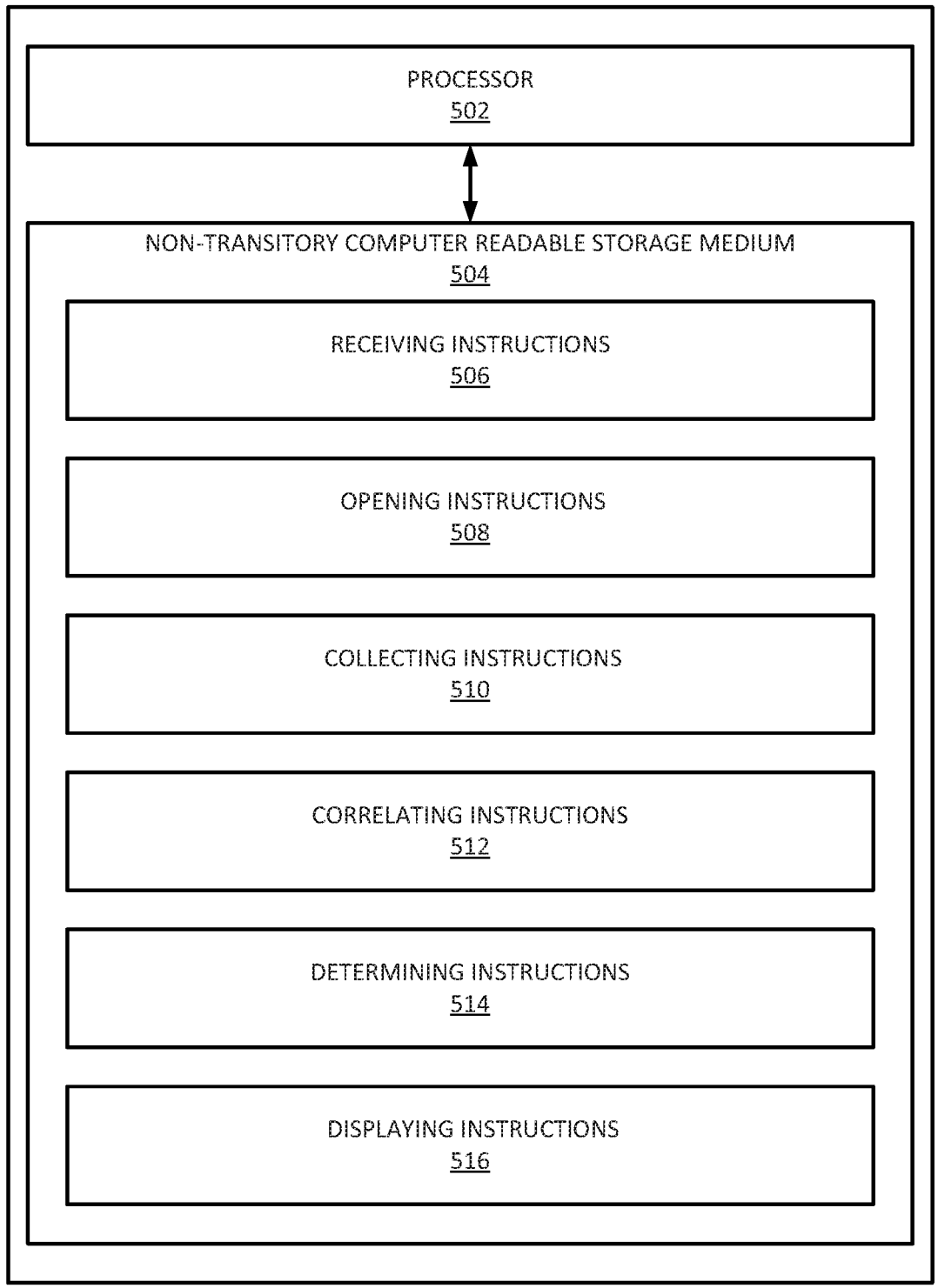
FIG. 5 is an example non-transitory computer readable storage medium storing instructions executed by a processor to execute HMD tracking and collision avoidance.

FIG. 5 illustrates an example of an apparatus 500. In an example, the apparatus 500 may be the HMD 106 or 114. In an example, the apparatus 500 may include a processor 502 and a non-transitory computer readable storage medium 504. The non-transitory computer readable storage medium 504 may include instructions 506, 508, 510, 512, 514, and 516 that, when executed by the processor 502, cause the processor 502 to perform various functions.

In an example, the instructions 506 may include receiving instructions 506. For example, the instructions 506 may receive virtual reality (VR) multi-player application data associated with a VR multi-player application from a host computer via first wireless radio. The VR multi-player application may be a video game, a training application, and the like. The host computer may also provide information related to a number of adjacent HMDs within the same room as the HMD receiving the VR multi-player application data.

The instructions 508 may include opening instructions. For example, the instructions 508 may open a channel to an adjacent HMD in the VR multi-player application via a second wireless radio.

The instructions 510 may include collecting instructions. For example, the instructions 510 may collect relative signal strength indicator (RSSI) data of the adjacent HMD via the channel opened on the second wireless radio.

The instructions 512 may include correlating instructions. For example, the instructions 512 may correlate the RSSI data to a distance. As discussed above, the strength of the RSSI signal may be correlated to a distance based on a pre-defined function. The distance of the adjacent HMD may be tracked based on periodically received RSSI data from the adjacent HMD.

The instructions 514 may include determining instructions. For example, the instructions 514 may determine that the distance of the adjacent HMD is below a distance threshold The instructions 516 may include displaying instructions. For example, the instructions 516 may display a collision avoidance warning in response to the distance of the adjacent HMD being below the distance threshold.

Figure 6:
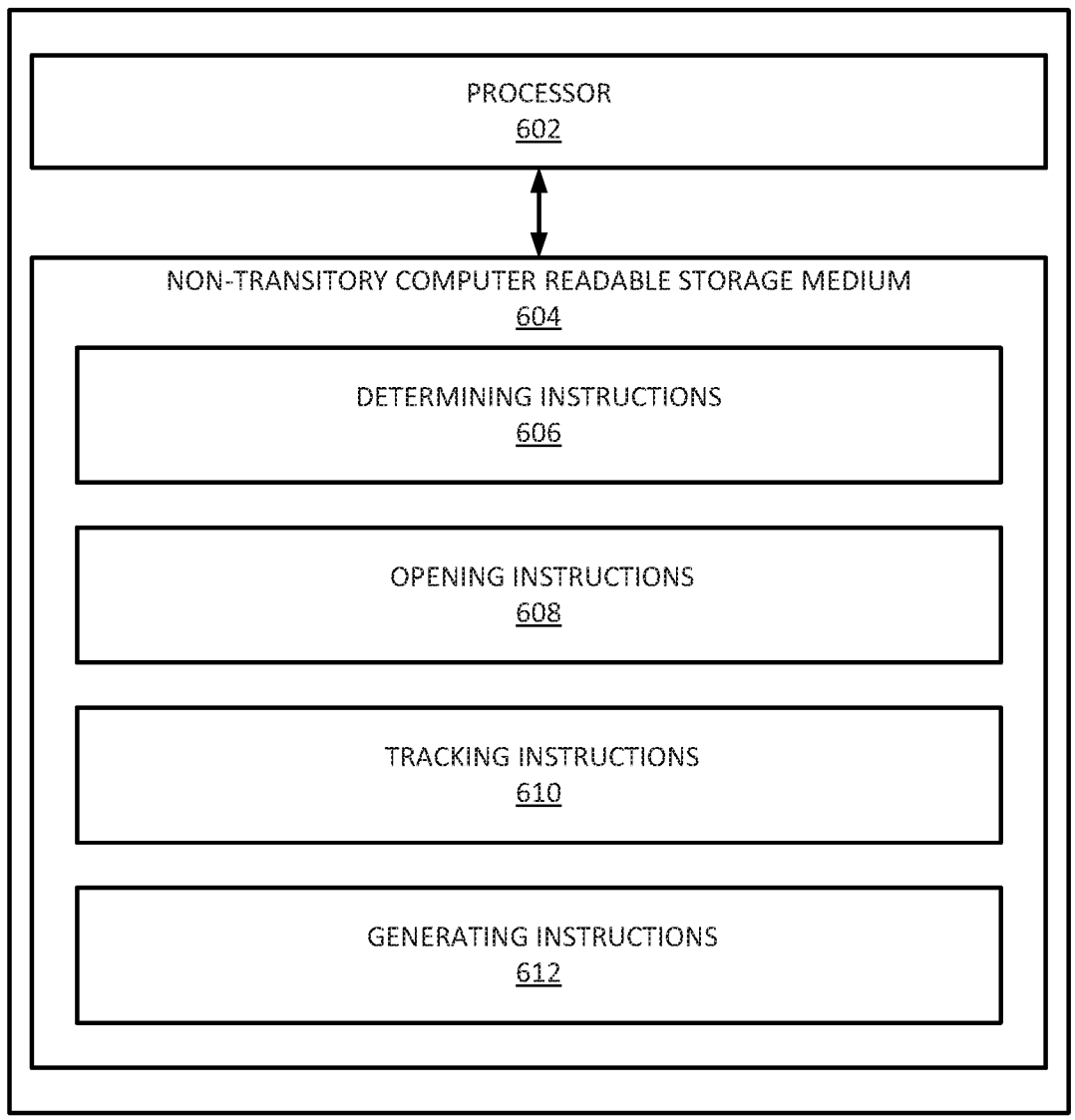
FIG. 6 is an example non-transitory computer readable storage medium storing instructions executed by a processor to generate a collision avoidance alert of the present disclosure.

FIG. 6 illustrates an example of an apparatus 600. In an example, the apparatus 600 may be the HMD 106 or 114. In an example, the apparatus 600 may include a processor 602 and a non-transitory computer readable storage medium 604. The non-transitory computer readable storage medium 604 may include instructions 606, 608, 610, and 612 that, when executed by the processor 602, cause the processor 602 to perform various functions.

In an example, the instructions 606 may include determining instructions 606. For example, the instructions 606 may determine a presence of an adjacent HMD in a room with the HMD. For example, a host computer may provide information related to a number of adjacent HMDs located in the room with the HMD via a first wireless radio.

The instructions 608 may include opening instructions. For example, the instructions 608 may open a channel to the adjacent HMD. In an example, if there are multiple adjacent HMDs, a channel may be opened for each adjacent HMD. A channel may be assigned to one adjacent HMD. The assignments between channels and adjacent HMDs may be stored in memory.

The instructions 610 may include tracking instructions. For example, the instructions 610 may track a distance and a direction of movement of the adjacent HMD via signal strength data collected over the channel. For example, signal strength data may provide distance information and directional information. As discussed above, the distance information may be correlated to the signal strength. The direction may be determined based on an angle of arrival of the signal strength data or a triangulation of the signal strength data from an antenna array.

The instructions 612 may include generating instructions. For example, the instructions 612 may generate a collision avoidance warning based on the distance of the adjacent HMD and includes a direction of collision based on the movement of the adjacent HMD that is tracked. The collision avoidance warning may provide a suggestion to move in a particular direction to avoid the collision based on the direction the potential collision is coming from.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A head mounted display (HMD), comprising:
a first wireless radio to establish a connection to a host computer;
a second wireless radio to connect to a second HMD via a channel; and
a controller communicatively coupled to the first wireless radio and the second wireless radio, the controller to:
receive a notification of a presence of the second HMD from the host computer via the connection;
track movement of the second HMD via the channel; and
generate a collision avoidance alert when the second HMD is within a distance threshold of the HMD, wherein the collision avoidance alert comprises a visual warning that appears on a display of the HMD and wherein the visual warning includes location information identifying a direction of prediction physical collision.

2. The HMD of claim 1, wherein the first wireless radio and the second wireless radio comprise Wi-Fi radios.

3. The HMD of claim 1, further comprising:
a memory to store a first assignment information, wherein the first assignment information is related to a wireless communication channels assigned to the second HMD.

4. The HMD of claim 1, wherein the controller tracks movement of the second HMD by collecting relative signal strength indicator (RSSI) data from a respective wireless radio of the second HMD.

5. The HMD of claim 1, wherein the connection is to receive application data associated with a virtual reality multi-player video game.

6. A non-transitory computer readable storage medium encoded with instructions, when executed, cause a processor of a head mounted display (HMD) to:
receive virtual reality (VR) multi-player application data associated with a VR multi-player application from a host computer via a first wireless radio;
open a channel to an adjacent HMD in the VR multi-player application via a second wireless radio;
collect relative signal strength indicator (RSSI) data of the adjacent HMD via the channel opened on the second wireless radio;
correlate the RSSI data to a distance;
determine that the distance of the adjacent HMD is below a distance threshold; and
display a collision avoidance warning in response to the distance of the adjacent HMD being below the distance threshold, wherein the collision avoidance warning comprises a visual warning that appears on a display of the HMD at a location that corresponds to a direction from which a collision is to occur.

7. The non-transitory computer readable storage medium of claim 6, wherein the instructions when executed further cause the processor to:
open an additional channel for a second adjacent HMD in the VR multi-player application; and
assign the second adjacent HMD to the additional channel.

8. The non-transitory computer readable storage medium of claim 7, wherein the instructions when executed further cause the processor to:
store assignments of the adjacent HMD and the second adjacent HMD to the channel and the additional channel, respectively, in a memory.

9. The non-transitory computer readable storage medium of claim 6, wherein the distance threshold is based on the signal strength data.

10. A non-transitory computer readable storage medium encoded with instructions, when executed, cause a processor of a head mounted display (HMD) to:
determine a presence of an adjacent HMD in a room with the HMD;
open a channel to the adjacent HMD;
track a distance and a direction of movement of the adjacent HMD via signal strength data collected over the channel;
generate a collision avoidance warning based on the distance of the adjacent HMD and include a direction of collision based on the direction of movement of the adjacent HMD that is tracked; and
wherein the collision avoidance warning comprises a visual warning that appears on a display of the HMD at a location that corresponds to a direction from which a collision is to occur.

11. The non-transitory computer readable storage medium of claim 10, wherein the direction of movement of the adjacent HMD is tracked via changes in the signal strength data.

12. The non-transitory computer readable storage medium of claim 10, wherein the direction of movement of the adjacent HMD is tracked via triangulation of the signal strength data from the adjacent HMD.

* * * * *